(12) United States Patent
Christie et al.

(10) Patent No.: US 9,875,457 B2
(45) Date of Patent: Jan. 23, 2018

(54) TICKET BASED HARVEST MANAGEMENT SYSTEM AND METHOD

(71) Applicants: Patrick Christie, Minneapolis, MN (US); Michael Borman, Minneapolis, MN (US)

(72) Inventors: Patrick Christie, Minneapolis, MN (US); Michael Borman, Minneapolis, MN (US)

(73) Assignee: Conservis Corporation, Minneapolis, MN (US)

( * ) Notice: Subject to any disclaimer, the term of this patent is extended or adjusted under 35 U.S.C. 154(b) by 288 days.

(21) Appl. No.: 14/559,991

(22) Filed: Dec. 4, 2014

(65) Prior Publication Data

US 2015/0186838 A1 Jul. 2, 2015

Related U.S. Application Data (62) Division of application No. 13/551,916, filed on Jul. 18, 2012, now abandoned.

(60) Provisional application No. 61/508,819, filed on Jul. 18, 2011.

(51) Int. Cl.
*G06Q 10/08* (2012.01)
*G01S 5/00* (2006.01)
*G06Q 50/02* (2012.01)

(52) U.S. Cl.
CPC .......... *G06Q 10/087* (2013.01); *G01S 5/0027* (2013.01); *G01S 5/0072* (2013.01); *G06Q 10/08* (2013.01); *G06Q 50/02* (2013.01)

(58) Field of Classification Search
CPC combination set(s) only.
See application file for complete search history.

(56) References Cited

U.S. PATENT DOCUMENTS

| 6,216,071 B1* | 4/2001 | Motz | A01D 41/12 340/988 |
| 6,687,616 B1* | 2/2004 | Peterson | A01B 79/005 702/5 |
| 7,169,040 B2 | 1/2007 | Kormann et al. | |

(Continued)

FOREIGN PATENT DOCUMENTS

| EP | 02390833 | 11/2011 |
| WO | 2007092520 | 8/2007 |

OTHER PUBLICATIONS

May 11, 2015 PCT Preliminary Examination Report (Serial No. PCT/US14/25649)—Our Matter 5138.

(Continued)

*Primary Examiner* — Luna Champagne
(74) *Attorney, Agent, or Firm* — Tysver Beck Evans, PLLC (57) ABSTRACT

A system and method is presented for gathering data concerning harvests. Data tickets are generated when the harvest is received at a point of origination (i.e., the field), local storage, processing, or a customer location. Data tickets can be manually generated using apps running on mobile devices. Users of the mobile devices input the data tickets when harvest is received at these locations. Data tickets are transmitted to a remote server over a wide area network. Analysis of the data tickets is possible through a web interface to the remote server. Beacons that identify various equipment or locations can be used to trigger the automatic generation of data tickets.

13 Claims, 9 Drawing Sheets

(56) References Cited

U.S. PATENT DOCUMENTS

| | | | |
|---|---|---|---|
| 8,185,275 B2 | 5/2012 | Han et al. | |
| 8,254,351 B2 * | 8/2012 | Fitzner | A01B 79/005 370/338 |
| 2006/0004484 A1 | 1/2006 | Hornbaker et al. | |
| 2006/0014489 A1 * | 1/2006 | Fitzner | A01B 79/005 455/3.02 |
| 2006/0111845 A1 | 5/2006 | Forbis et al. | |
| 2006/0271262 A1 | 11/2006 | Mclain, III | |
| 2010/0070145 A1 * | 3/2010 | Foster | A01B 79/005 701/50 |
| 2011/0075589 A1 * | 3/2011 | Bradley | H04W 48/16 370/254 |
| 2011/0290873 A1 | 12/2011 | Nishiguchi et al. | |
| 2012/0072533 A1 | 3/2012 | O—neil | |
| 2012/0226390 A1 | 9/2012 | Adams et al. | |
| 2012/0263560 A1 | 10/2012 | Diekhans et al. | |
| 2013/0006481 A1 | 1/2013 | Foster | |
| 2013/0006517 A1 | 1/2013 | Ofek et al. | |
| 2013/0024330 A1 | 1/2013 | Christie et al. | |

OTHER PUBLICATIONS

Jul. 28, 2015 USPTO Office Action (U.S. Appl. No. 13/832,661)—Our Matter 4919.
Aug. 21, 2015 USPTO Office Action (U.S. Appl. No. 13/889,736)—Our Matter 4999.
May 2, 2016 USPTO Office Action (U.S. Appl. No. 13/889,736)—Our Matter 4999.
Jun. 2, 2016 USPTO Office Action (U.S. Appl. No. 13/832,661)—Our Matter 4919.
Jan. 23, 2015 USPTO Office Action (U.S. Appl. No. 13/551,916)—Our Matter 4887.
Dec. 31, 2014 USPTO Office Action (U.S. Appl. No. 13/832,661)—Our Matter 4919.
Jul. 28, 2014 PCT Search Report (U.S. Appl. No. PCT/US14/25649)—Our Matter 5138.
Mar. 23, 2017 USPTO Office Action (U.S. Appl. No. 13/832,661)—Our Matter 4919.
European Search Report—Our File 5381.

* cited by examiner

TICKET BASED HARVEST MANAGEMENT SYSTEM AND METHOD

RELATED APPLICATION

This application is a divisional of U.S. patent application Ser. No. 13/551,916, filed Jul. 18, 2012, which in turn claims priority to U.S. Provisional Application 61/508,819, filed Jul. 18, 2011, each of which are hereby incorporated by reference in their entireties.

FIELD OF THE INVENTION

The present application relates to the field of automated harvest management. More particularly, the described embodiments relate to a system and method for tracking harvesting in mining, agricultural, and forestry industries through automated data ticket processing.

SUMMARY

The presented embodiments disclose a flexible, cloud-based tool that provides an automated method to record the harvest and distribution process, and tools to meet unique requirements of farming operations. The system integrates with a farm's existing infrastructure to capture and record data necessary in order to secure harvested crops from the field to the point of delivery. The system also integrates with forestry and mining inventory to secure harvested wood or mining products from the point of origination to the point of delivery.

The disclosed embodiments provide unprecedented control over harvest security, updating critical data on a daily or even real-time basis. Issues are identified. Compounding problems are prevented. Workers are held accountable. Accurate accounting is possible. All of which translates into improved transparency for stakeholders: bankers, investors, insurance agents and most importantly, the farmer, forester, or miner.

Through use of the disclosed system and method, farmers, foresters, and miners accurately track and trace key harvest and distribution activities. This is accomplished by:
 recording weights and quality levels for material harvested at the field or forest level, or mined at the mine level.
 recording and tracking product stored in point of origin storage.
 recording product transportation activities on a per load basis.
 recording product loads delivered to internal storage facilities.
 recording product weights and quality levels for loads delivered to customers.
 reconciling all activities and view product data in real time.

DETAILED DESCRIPTION

Overview

The present invention can be used to track goods that are obtained through farming, forestry, mining, drilling, and similar processes. For instance, agricultural crops such as corn or cotton are ideal candidates for tracking through the disclosed embodiments of the present invention. In addition, lumber obtained through harvesting forests can also be tracked, as can coal or other materials that are removed from the earth through mining, and oil, natural gas, and other hydrocarbonic materials removed from the earth through drilling. The current description will describe the use of the present invention in connection with farming. Nonetheless, it should be clear that the same systems and processes can be used in these other contexts as well.

Figure 1:
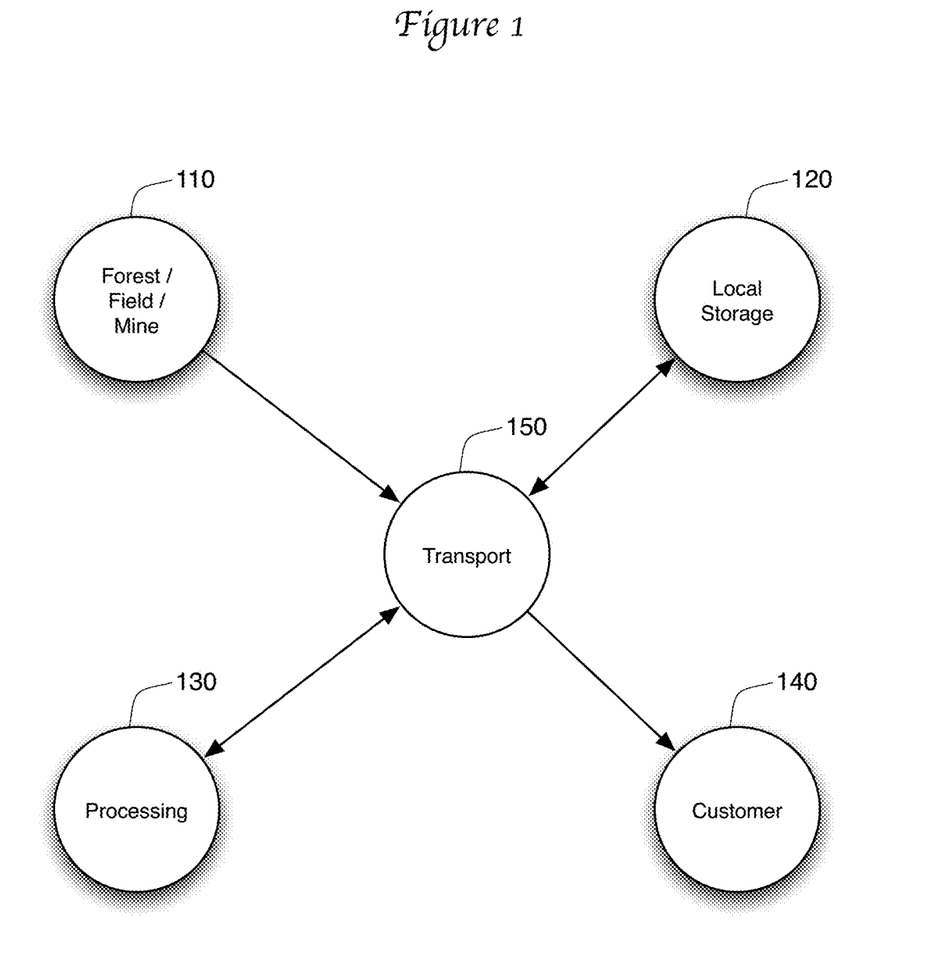
FIG. 1 is a schematic diagram showing locations that can be used to source, store, process, or receive the goods from a farm, forest, or mine.

FIG. 1 shows four key locations where the harvest data is to be obtained. In particular, data is to be obtained at the field 110 (or forest or mine) where the product to be tracked originates. In addition, data is to be obtained at local storage facilities 120 where the crop (or other product) can be stored temporarily after being collected. Data is also obtained at processing facilities 130, such a cotton gin or crop drying facility that processes or transforms the crop in some way. Finally, data is obtained when products or crops are delivered to a customer 140 that pays the farmer for their crop. These different locations 110-140 are shown connected by some type of transport 150. The transport 150 may be a truck, train, barge, pipeline, or any other transportation mechanism.

By tracking data about a crop at various locations, it is possible to accumulate comprehensive data about a farmer's harvest in a way that has not been previously possible. It is important to track this data at the locations 110-140 specified in FIG. 1 because it is at these locations that a crop must be carefully monitored for potential loss or other events. For instance, it is important for a farmer to confirm that the amount of crop taken off the field and delivered to a trucking firm is the same as the amount of crop received and paid for by the farmer's customer. In addition, monitoring the crop at these locations also allows the farmer to analyze their business for profitability. For example, by tracking the crop that comes off each field 110, the farmer can determine the comparative yield for each field. These results can be compared to the inputs (such as seed, fertilizer, pesticides, labor) that created that crop in each field to determine whether changes in procedures might increase the profitability of a farm.

Figure 2:
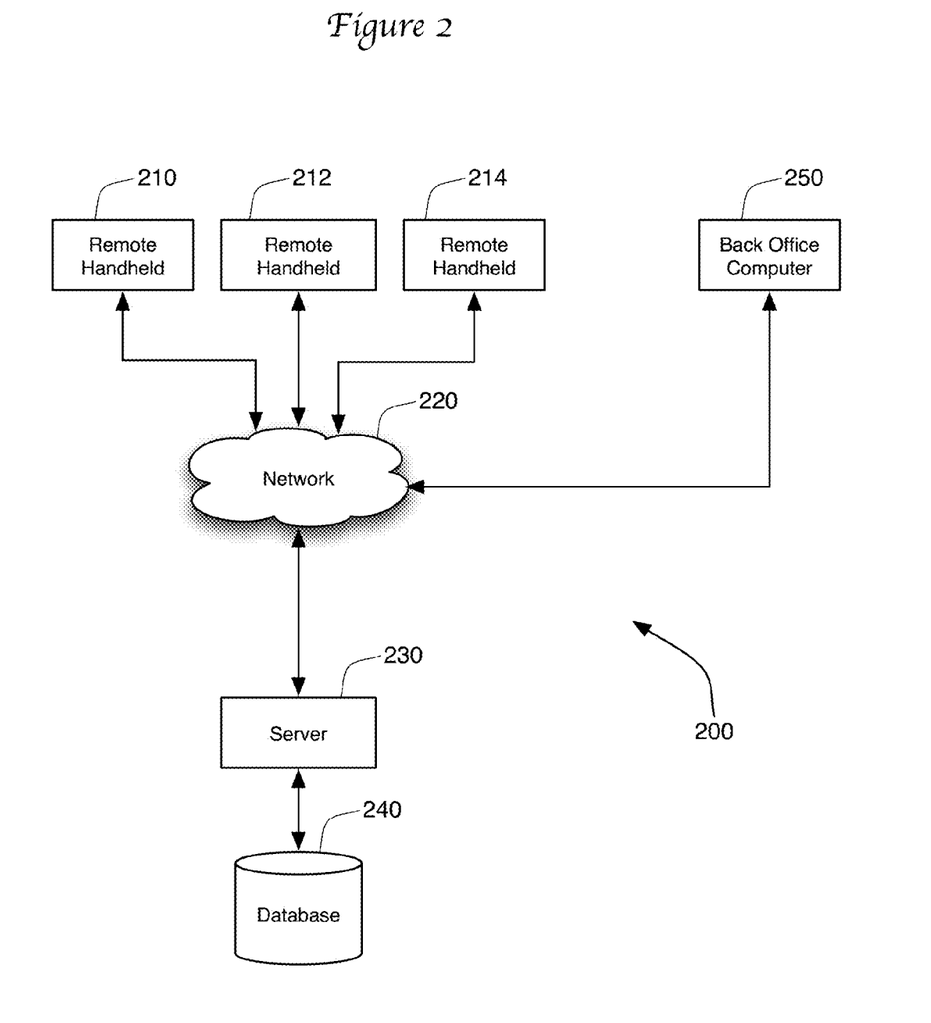
FIG. 2 is a schematic diagram showing the components of a system that gathers, stores, and processes data in accordance with one embodiment of the present invention.

FIG. 2 shows one system 200 that can be used to track this harvest data. In this system, a plurality of handheld devices 210, 212, 214 are used by the farmer to obtain data about the harvest. For instance, a worker in the field cart can record on handheld device 210 information about each cartload of a crop that is delivered to a semi truck for transportation. This information can include the field where the crop was harvested, the time and date of that harvest, an identifier for the field cart being operated by that worker, the weight of the crop that was delivered to the semi, the particular semi that received the crop, and the driver of that semi. Additional information could also be collected, such as descriptors about the weather (sunny, cold, etc.) and descriptions about the crop (healthy, wet, etc.). Similarly, another worker can use handheld device 212 to receive information about the delivery of the crop from that semi to the farmer's local storage facility 120, while a third worker can use handheld device 214 to record information about deliveries made directly to customers 140.

Data relating to the receipt of crops at the various data gathering locations 110-140 is recorded on the handheld devices 210-214 as data "tickets." Data tickets contain data, typically in a plurality of structured data fields, concerning a transfer of a crop from one location to another. The devices 210-214 then transmit these data tickets over a network 220 to a remote server 230, which then stores the data in a database 240. In one embodiment, the network 220 is a wide area network such as the Internet. The handhelds 210-214 can access the Internet 220 through a WiFi network. Frequently, the handhelds 210-214 will be gathering data in locations that do not have WiFi access easily available, such as in a farmer's field. In one embodiment, the handhelds 210-214 allow input of data even when the device does not have network access. This data is cached in local storage on the device. The handhelds 210-214 then periodically determine whether access to the network 220 is available. If so, data cached in the local storage is then sent to the server 230 over the network 220.

In another embodiment, the handheld devices 210-214 include cellular capabilities, such as smart phones or tablet computers using Apple's iOS (from Apple Inc., Cupertino Calif.) or the Android operating system (from Google Inc., Mountain View, Calif.). These types of devices can frequently transmit data over the Internet 220 using cellular data networks. With such capabilities, data can be transmitted to the server 230 immediately upon data entry as long as the device 210 is within range of a cellular tower with data capabilities. Even with this embodiment, the devices 210-214 are preferably designed to cache data when the network 220 is not immediately available.

The data is accumulated in database 240, and then made available to the farmer through a back office computer 250 operating over the same network 220 and server 230 that was used to collect the data from the remote handheld devices 210-214. In other embodiments, different or multiple physical servers could perform the function of the server 230 shown in FIG. 2 without altering the scope of the present invention.

The back office computer 250 accesses the database 240 through programming provided by the server 230, ideally through a web browser or other thin client operating on the computer 250. In effect, data collection and data analysis for the farmer are provided using a software-as-a-service model. The farmer pays the operator of the server 230 and database 240 for the right to store data in the database 240 and to use software operating on the server 230 to analyze this data. This frees the farmer from the headaches of maintaining the network and server needed to store and backup the data. Meanwhile, the operator of the server 230 and database 240 offers the same service to multiple farmers.

The data analysis software provided to the back office computer 250 allows the farmer to compare payments received from a customer (as evidenced through settlement documents and delivery receipts from the customer) with data tickets specifying the amount of crop that was delivered to that customer. Furthermore, the farmer can verify that the amount of crop taken from the fields is equivalent to the crop that was either delivered to a customer or is otherwise in storage. This type of reconciliation is extremely valuable for farmers, especially since this data is almost immediately available given the nature of the data ticket submission described herein. Reconciliation errors that indicate missing crop can be immediately tracked down to a particular worker, piece of equipment, date, and time. In addition, the analysis software available through the back office computer can also give the farmer the ability to analyze the productivity of individual fields in a way that was not otherwise possible for most farmers.

The server computer 230 and the back office computer 250 includes a set of software instructions or interfaces stored on a non-volatile, non-transitory, computer readable medium such as a hard drive or flash memory device. A digital processor, such as a general purpose CPU manufactured by Intel Corporation (Mountain View, Calif.) or Advanced Micro Devices, Inc. (Sunnyvale, Calif.) accesses and performs the software. To improve efficiency, processor may load software stored in its non-volatile memory into faster, but volatile RAM. The database 240 can be stored on the same non-volatile memory used by the server computer 230 for its operating system, or on a different memory accessible by its process such as an external direct access storage device (or DASD). The database 240 consists of both data and software instructions informing the server computer 230 how to access, analyze, and report on the data in the database 240.

The computers 230, 250 further include a network interface to communicate with other computerized devices across a digital data network such as network 220. In one embodiment, the network is the Internet, and the network interfaces on the computers 230, 250 include TCP/IP protocol stacks for communicating over the network 220. The network interface may connect to the network wirelessly or through a physical wired connection. Instead of being a single computer with a single processor, the server 230 could also implemented using a network of computers all operating according to the instructions of the software.

Ticket Generation

Figure 3:
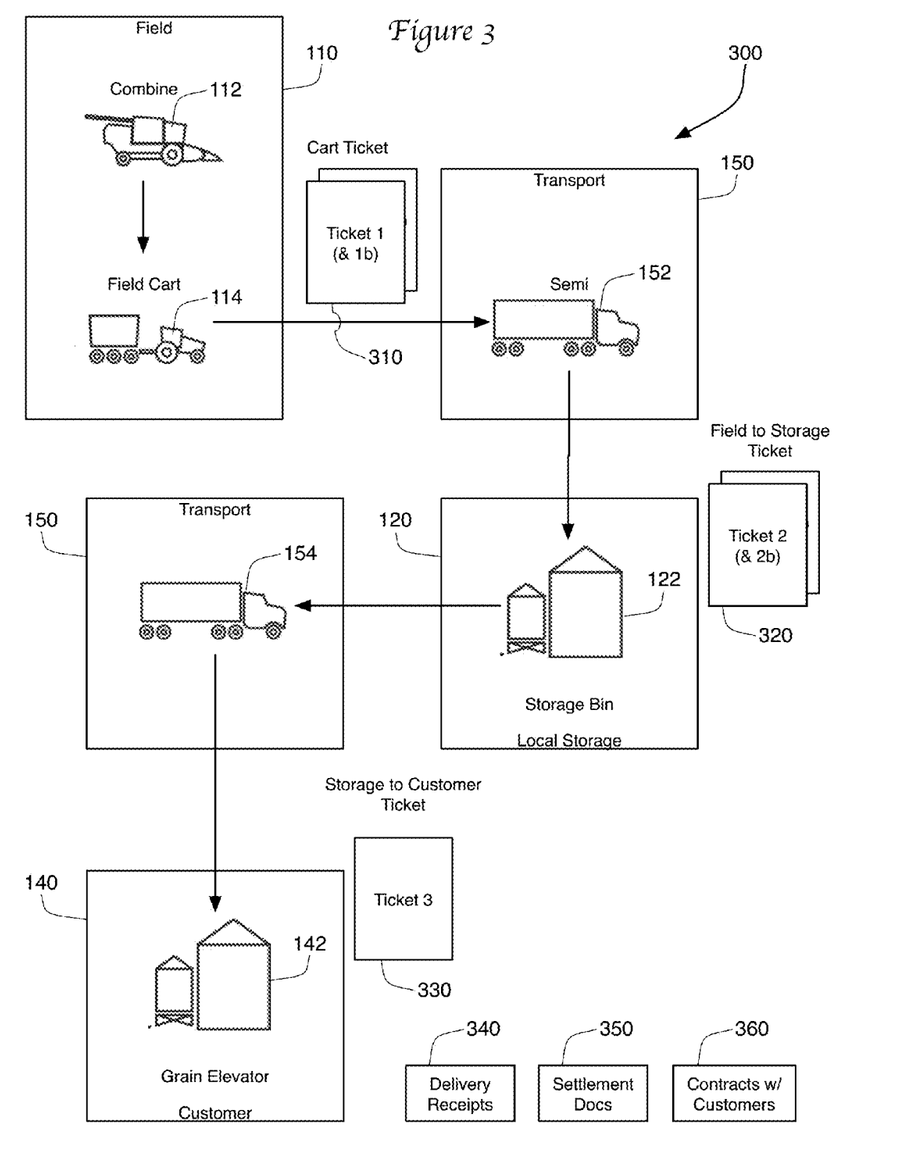
FIG. 3 is a schematic diagram showing a three-ticket process that takes goods from a field, stores the goods in local storage, and then delivers the goods from storage to a customer.

FIG. 3 shows a typical process 300 used by a farmer to track crops coming off a field 110. In this process, a combine 112 in the field 110 takes the crop off the field 110. Periodically, the combine 112 transfers its load to a field cart 114, which then takes its load to one or more waiting semi trucks 152 for transport 150. In this embodiment, a data ticket 310 is created when the crop is transferred from the cart 114 to the semi 152. This first data ticket 310 is referred to as a cart-to-truck ticket (or simply "cart ticket") 310. In this embodiment, the cart ticket 310 is created by a worker operating the field cart 114. Using their handheld device 210, the worker opens an application (or app) that operates on the device 210. The worker logs into the app, so that the app knows the worker's identifier, the particular field being worked by the worker, as well as an identifier for the cart 114 being operated by the worker. When the transfer is made to the semi 152, the worker tells the app to create a cart ticket 310. The worker must input or verify the crop, identify the semi 152 and the driver of the semi, and then input the amount of crop transferred to the semi 152. In most embodiments, the cart 114 has an integrated scale. The app requests that the worker input the weight on the scale before and after the transfer to the semi, with the calculated difference being the amount of the crop transferred to the semi. The worker may also include descriptors about the current weather conditions or the condition of the crop (i.e., "wet") with the data transmitted in the cart ticket 310.

In FIG. 3, the cart ticket 310 is the first ticket created, and is also called ticket 1. In some embodiments, the driver of the semi also has a handheld device 212, and the semi truck also contains a scale. In these embodiments, the semi driver will also create a cart ticket 310 (i.e., ticket 1*b*) indicated the amount of crop received from the cart 114, and the identifier of the cart and the cart operator. While these two cart tickets 310 contain essentially the same information, the creation of two tickets allows comparisons between the tickets and the ability to detect and correct faulty data from one of the tickets. Because the data is mostly duplicative, however, some embodiments would create only a single cart ticket 310.

In the process 300 shown in FIG. 3, the semi driver delivers their load to a local storage facility 120 on the farm. This storage facility may include a plurality of storage bins, including storage bin 122. When the load from the semi truck 152 is transferred to the storage bin 122, a second ticket (known as a field-to-storage ticket) 320 is created. This ticket 320 can be created by the operator of the truck 152 using the app running on their handheld device 112. Like the cart ticket 310, the field-to-storage ticket 320 contains information about the delivery equipment (semi 152 and the driver) as well as the receiving equipment (storage bin 122). A bin operator may have their own handheld device 114, and therefore may create their own version of the field-to-storage ticket 320 (ticket 2*b* in FIG. 3). Note that since the storage capabilities of the field carts 114 and the semi trucks 152 are not identical, there is not a one-to-one correspondence between the cart tickets 310 and the field-to-storage tickets 320.

A different semi truck 154 may then be used at a later date to take the crop from the storage bin 122 and deliver the crop to the customer 140. To track this transaction, the truck driver will create a storage-to-customer ticket 330 to track details about the delivery, including date, time, identifiers for the semi 154 and the driver, the originating location (storage bin 122), the receiving location (grain elevator 142 at the customer location 140), and the condition of the crop ("dry"). The crop condition may be based merely on general observations ("dry"), or may be made upon scientific tests establishing various characteristics of the crop (i.e., moisture content). These tests may be conducted at the farmer's storage facilities 120, at the customer's facilities 140, or at both locations.

If the customer participates in the system 200 with the farmer, the customer 140 could create a corresponding ticket 330. In most cases, however, the customer 140 does not participate, and instead presents the driver with a written delivery receipt 340. When payment is made to the farmer, the payment will likely include a settlement document 350 that includes the delivery information found on the delivery receipts 340. Payment associated with the settlement document 350 will relate to a specific contract 360 between the customer 140 and the farmer. Consequently, to complete the data record in the database 240 for proper tracking and reconciliation, it is contemplated that the interface provided by the server 230 to the back office computer 250 includes the ability for the farmer to enter information about written delivery receipts 340, settlement documents 350, and contracts 360.

Figure 4:
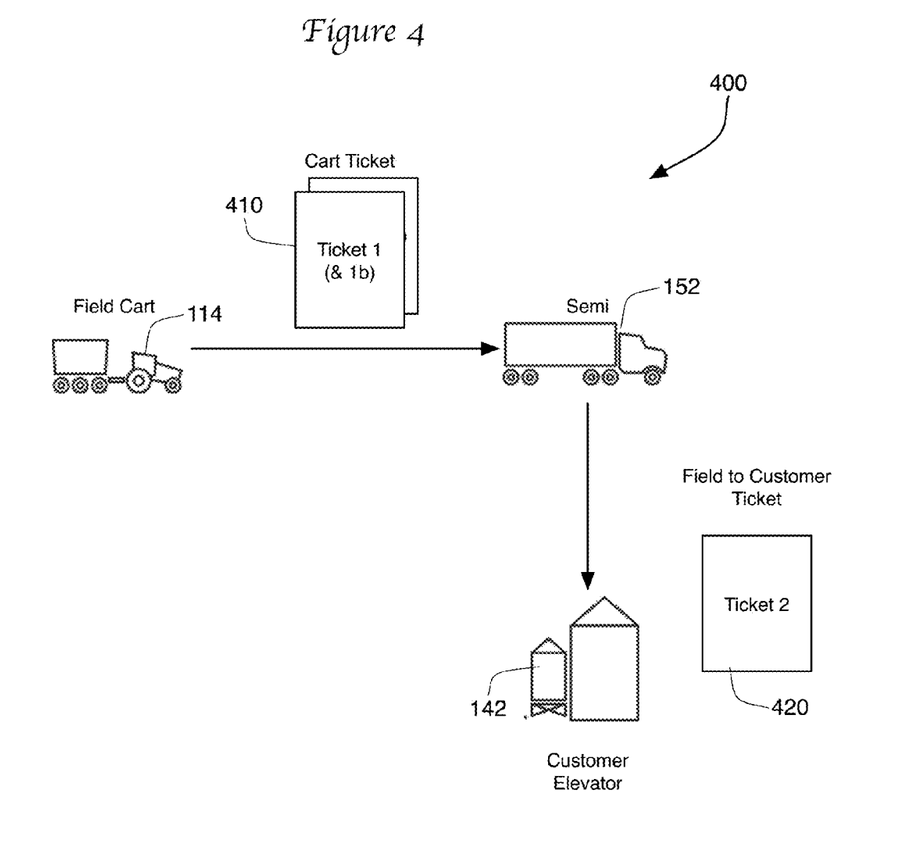
FIG. 4 is a schematic diagram showing a two-ticket process that takes goods from a field to a customer.

FIG. 4 shows a simplified process 400, where the farmer delivers their crop directly to a customer 140 without storing the grain at a local storage facility 120. In this case, the transfer from the field cart 114 to the semi truck 152 creates one or two first tickets (the cart ticket) 410. This cart ticket 410 is effectively the same as the cart ticket 310 created in process 300. Rather than transporting the crop to storage 120, the semi 152 in process 400 delivers the crop directly the customer elevator 142. When this delivery is made, the truck driver creates a second ticket known as a field-to-customer ticket 420.

Figure 5:
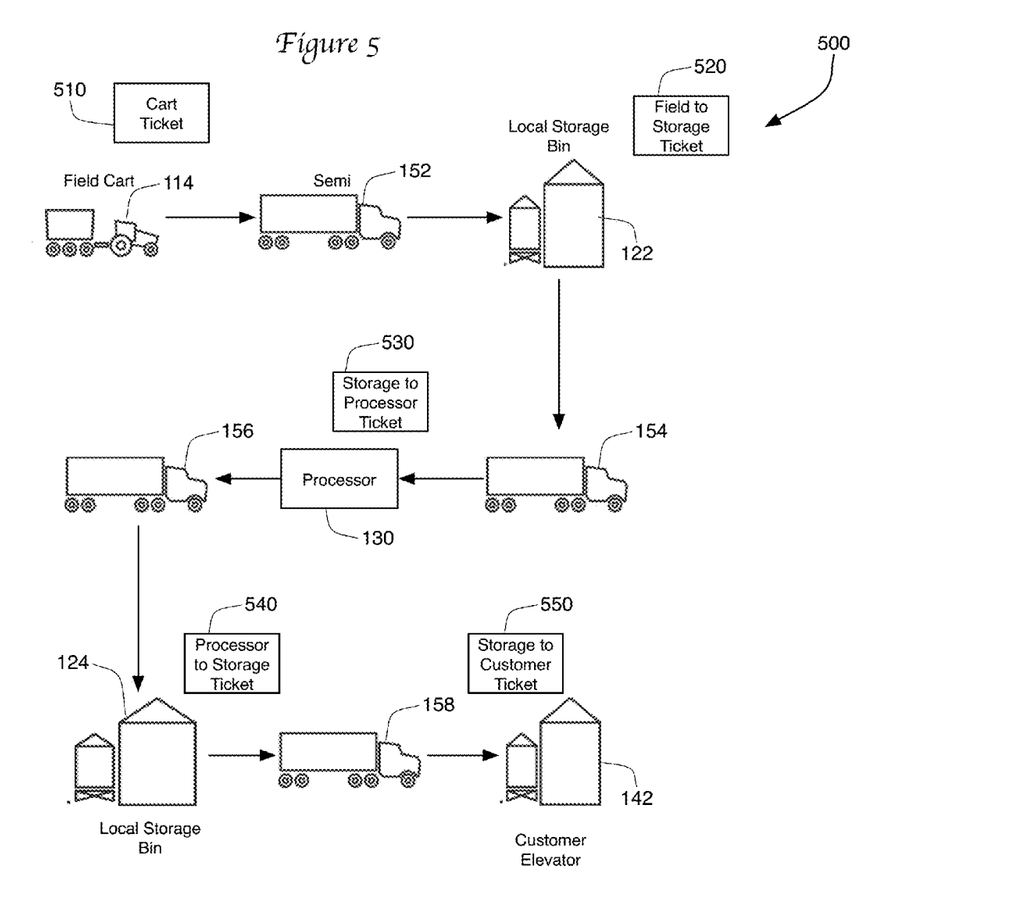
FIG. 5 is a schematic diagram showing a five-ticket process including a processing step.

The process 500 shown in FIG. 5 is similar to the processes 300, 400 shown in FIGS. 3 and 4, respectively, although process 500 contains more steps. In this case, the field cart 114 delivers the crop to semi 152, and in the process the operator or operators of these machines create a cart ticket 510. The semi 152 delivers the crop to the local storage bin 122, and a field-to-storage ticket is created 520 that is much like ticket 320 described above. In process 500, the farmer must pay a third party to process the crop. For instance, if the farmer were growing cotton, the farmer would pay a cotton gin facility to gin the cotton. A semi 154 is used to transfer to crop to the processor 130. When the crop is delivered to the processor, a storage-to-processor ticket 530 is created with details about the semi 154, the semi driver, the amount of crop delivered, the condition of the crop, the originating storage bin 122, and the specific processing facility of the processor 130 that received the crop.

After the processing is complete, a new semi 156 accepts the processed crop and delivers the crop back to local storage 120 on the farm. In this case, the crop is stored in storage bin 124. A processor-to storage ticket 540 is created detailing this transaction. Finally, the processed crop is taken from storage bin 124 by semi 158 and delivered to customer elevator 142, and a storage-to-customer ticket 550 is created.

In this embodiment, a data ticket is created every time the crop is received at the field 110, local storage 120, processor 130, or the customer 140. The field related ticket (cart ticket 310, 410, or 510) is created when harvesting of the crop (effectively receiving the crop at the field). By ensuring that a data ticket is created when the crop is received at each of these locations, the harvest is effectively tracked and monitored through each movement, storage, processing, and customer delivery step. It would be possible to create additional data tickets and still be within the scope of the present invention. However, additional tickets are not necessary to ensure the minimal level of tracking as exemplified in processes 300, 400, and 500.

Figure 6A:
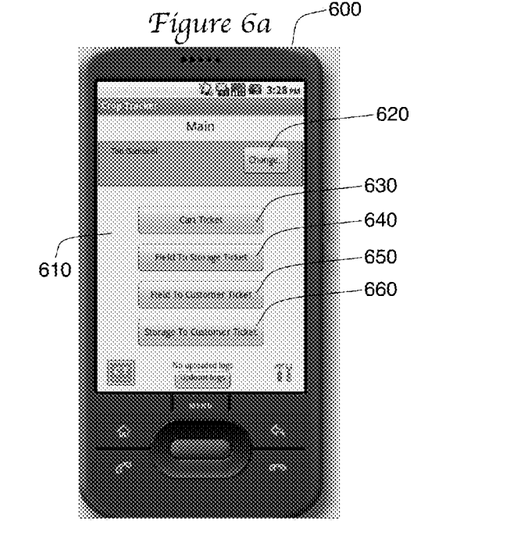
FIGS. 6a through 6f show screen shots from a ticket creation software application running on a mobile device, with FIG. 6a showing a home screen, FIG. 6b showing a cart ticket entry screen, FIG. 6c showing a field-to-storage ticket entry screen, FIG. 6d showing a field-to-customer ticket entry screen, FIG. 6e showing a storage-to-customer entry screen, and FIG. 6f showing additional data entry fields that form the storage-to-customer ticket entry screen of FIG. 6e.

FIG. 6*a* shows a mobile device 600 that could be used by an operator of a field cart 112 or semi truck 152, or an individual working at a storage location 120, processing location 130, or customer site 140. The mobile device 600 includes a processor (such as those created under the ARM architecture developed by ARM Holdings, Cambridge, UK) and tangible, non-transitory memory that contains both computing instructions (software) and data. The computing instructions include an application or "app" that allows the user to create data for the database 240. As explained above, this data is created in the form of tickets that contain data about a particular event relating to the receipt of product at one of the key locations 110-140. In the preferred embodiment, this app runs on a general purpose operating system, such as Apple's iOS or Google's Android operating system.

Furthermore, the preferred mobile device 600 includes network capabilities to allow the device 600 to communicate with the server 230 over the network 220. This could be provided by a WiFi or cellular network interface (or both) located within the device. Finally, the preferred device 600 includes location detection capabilities that can identify the location of the device 600. This helps in numerous situations, including the automated identification of a farmer's field in a cart ticket 310, 410, or 510. The device 600 is preferably a smart phone, a tablet computer, or any other similar device.

The app operating on the mobile device 600 creates a home screen 610, which provides the user with the ability to change information about the user by selecting change button 620. Information about the user, including the equipment or location being managed by the user can be entered into the app at this stage so that it doesn't need to be separately entered for each ticket created by the app.

Figure 6B:
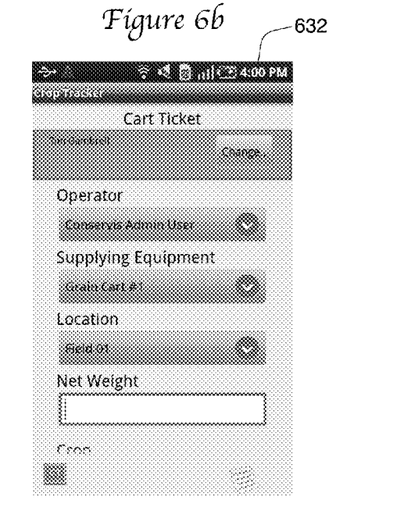
Figure 6C:
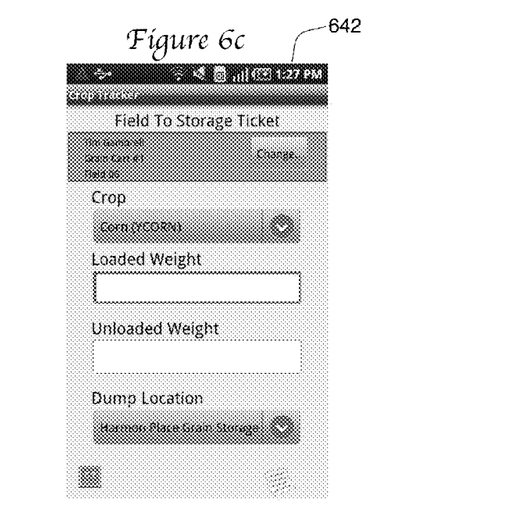
Figure 6D:
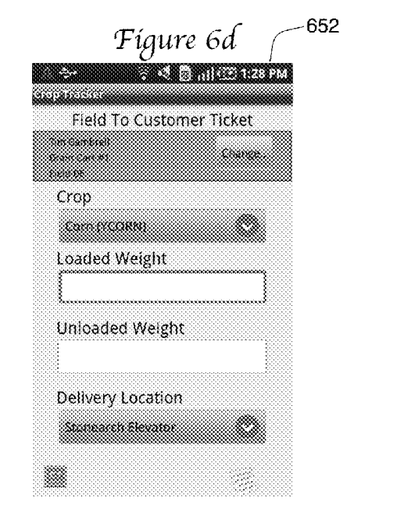
Figure 6E:
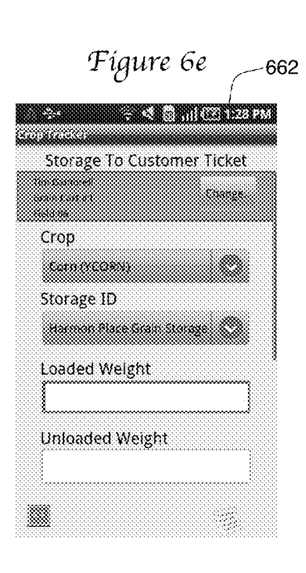
Figure 6F:
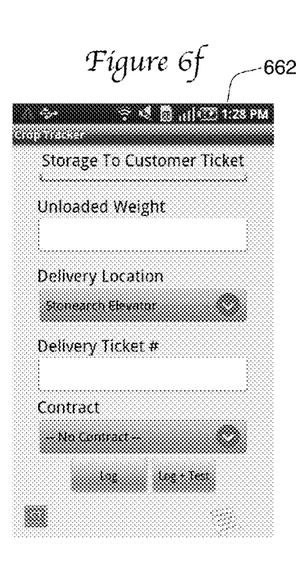

The home screen 610 also includes a cart ticket button 630, a field-to-storage ticket button 640, a field-to-customer ticket button 650, and a storage-to-customer ticket button 660. Each of these ticket creation buttons 630-660 bring up an entry screen for the user to enter the necessary data to create the desired ticket. The entry screen 632 for the cart ticket is shown in FIG. 6b, and can be reached by pressing the cart ticket button 630 on the home screen 610. Similarly, the field-to-storage ticket entry screen 642 (FIG. 6c), the field-to-customer ticket screen 652 (FIG. 6d), and the storage-to-customer entry screen 662 (FIG. 6e) can be reached by selecting buttons 640, 650 and 660, respectively. The ticket entry screens 632, 642, 652, and 662 allow the user to enter the data necessary to complete the data ticket. To the extent possible, permissible data has been predefined in the database 240, preferably through the back office computer 250. This permissible data is downloaded by the app running on the mobile device 600, allowing many of the fields in the ticket entry screens 632-662 to be filled in through pull down selection menus. In most cases, the entry screens 632-662 contain more data than can be viewed at once on the mobile device. Consequently, the entry screens 632-662 preferably scroll up and down to allow the user to access all of the data fields. FIG. 6f, for example, shows the additional data entry fields that form the storage-to-customer ticket entry screen 662 that were not shown in FIG. 6e.

Automatic Ticket Generation

Figure 7:
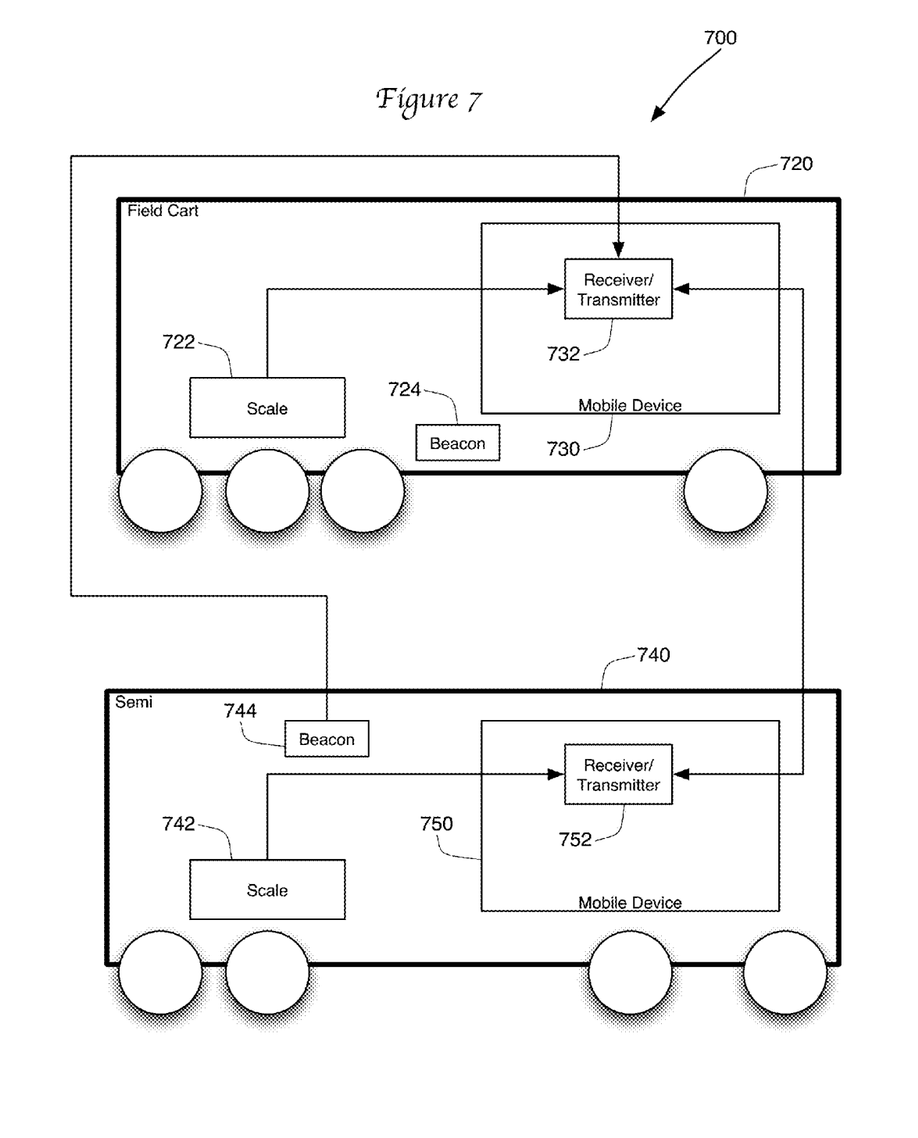
FIG. 7 is a schematic diagram showing system capable of ticket generation without human interaction.

FIG. 7 shows an alternative embodiment system 700 that allows the automatic generation of data tickets. This system 700 takes advantage of the fact that the tickets created in the previously described embodiment are generated when product is received at a location. In the case ticket generation scenarios described above, a piece of equipment that contains the product is brought into proximity with another piece of equipment that will receive the product. The equipment might be the field cart 114, the semi 152, the storage bin 122, the grain elevator 142, or equipment at a processing location 130. System 700 takes advantage of this fact by detecting the proximity of another piece of equipment, and using that detection to generate a ticket and to determine the data necessary to complete the ticket.

This is accomplished by using beacons in field equipment to broadcast equipment location so that when two pieces of equipment are within sufficient range, the beacon in either piece of equipment can broadcast a signal unique to the piece of equipment that can be recognized by a mobile device (e.g. an Android phone or tablet) in the other piece of equipment. In terms of uniqueness, all that is necessary is that the beacon be unique in the context in which the equipment is used. In the context of a farm utilizing 25 different pieces of farm equipment, the beacons must be unique to that farm. A beacon would be considered unique even if the beacon utilizes the same signal as a different but remote beacon not used on the farm. In FIG. 7, a field cart 720 loaded with crop from the field approaches a semi truck 740, which is waiting for the cart 720 on a road proximate to the field. The field cart 720 contains a scale 722 that weighs the current load on the cart. Preferably, this scale 722 can be wirelessly queried by other devices, which causes the scale to return the current weight of the load carried by the cart 720.

The field cart 720 also contains a mobile device 730 operating an application designed to automatically generate data tickets. A beacon 744 on the semi truck 740 continuously or periodically transmits a signal that can be received by a receiver or receiver/transmitter 732 on the mobile device 730. The app running on the mobile device 730 recognizes the beacon as belonging to a particular semi 740. Alternatively the receiver 732 can be located separately from the mobile device elsewhere on the field cart 720. For instance, a beacon device 724 that transmits a beacon for the field card 720 may also include a receiver that detects the presence of the beacon 744 from semi 740. This would allow the manufacturer of the beacon technology to sell a combination beacon transmitter and beacon detector. When this beacon detector detects the beacon 744, the detector will signal the mobile device 730 with information about the beacon 744.

In yet another embodiment, the semi 740 does not have a beacon device 744 to signal its presence. Instead, a mobile device 750 on the semi 740 has its own transmitter and receiver device 752. The transceiver could be, for instance, a WiFi transceiver sending and receiving signals according to one of the IEEE 802.11 standards. A similar transceiver 732 in the mobile device 730 riding in the field cart 720 would detect the presence of the signal from the mobile device 750. The presence of this signal could inform the mobile device 730 in the field cart of the presence of the semi's mobile device 750. At this point, field cart mobile device 730 could consult an internal or external database to learn information about whether the semi mobile device 750 is currently operating. Alternatively, the field cart mobile device 730 could establish a network or other data connection with the semi mobile device 750 after that device 750 is detected. The two mobile devices 730, 750 could then exchange data stored in each device 730, 750 about how each device, 730, 750 is currently being used.

For example, the mobile device 730 could monitor its WiFi receiver to detect the presence of another mobile device transmitting a WiFi signal. The strength of the signal received can be used to determine the nearest machine. Once the signal from the semi's mobile device 750 is received, the two devices 730, 750 establish a communication interface or link. In this way, the field cart mobile device 730 learns that the field cart 720 has approached a particular semi 740 currently being driven by a particular operator.

When the semi's beacon 744 is detected, or the signal from the semi's mobile device 750 is received and understood, the field cart mobile device 730 then begins to query and monitor the scale 722 operating on the field cart 720. Alternatively, the mobile device 730 may be capable of extracting and reading other equipment related data streams, such as speed, acceleration, braking, and dumping from the field cart 720. The app on the mobile device 730 can interpret the mechanical activity data generated from the equipment in which the smart device is located (i.e., that the cart is unloading its load) or can monitor changes in the scale 722 to see that the load in the cart has lessened. By intelligently monitoring these on-cart devices, the mobile device 730 will be able to tell when a transfer of the product has completed, and also will be able to tell the amount of product that has been transferred. By combining this information with the beacon data (which other equipment 740 is near or nearest the cart 720), the mobile device can detect the need to generate a ticket, complete the data in the ticket, and transmit the ticket to the server 230, all without any user intervention.

In FIG. 7, the field cart 720 and the semi truck 740 each have beacons 724, 744 and each have smart devices 730, 750, respectively. The semi 740 may be parked next to the field currently being harvested, such as on an access road. The semi 740 remains on the road waiting to be filled, and might be located next to other semi trucks (not shown in FIG. 7). When the field cart 720 is full, the operator drives to the side of the field and approaches the trucks. The field cart 720 stops closest to the first semi truck 740 in line to unload.

The smart device 730 in the cart 720 may receive a data stream from devices on the cart 720 indicating that the cart 720 is stopped. The mobile device 730 will sense the beacon data from beacon 744 and determine which semi truck 740 is closest to the device 730. The device 730 will next sense that the cart 720 is unloading from the data stream from the monitoring equipment on the cart 720 (such as scale 722). As a result the smart device will have the capability to generate an activity record (a cart ticket) that documents the following:
  Activity date
  Activity time
  Activity type
  Initiating equipment (grain cart id—signed into the device)
  Initiating operator (grain cart driver—signed into the device)
  Receiving equipment (truck id—recognized from the truck beacon
  Receiving operator (recognized from the truck beacon)
  Activity location (from the smart device and or device GPS)
  Truck weight (from scale data collected by smart device)

Similarly, a smart device 750 in the truck 740 will be able to create data tickets as well. If the system 700 was so set up, the truck's device 750 could create a corresponding cart ticket based on readings from its own scale 742, and information obtained from the beacon 724 operating on the cart 720. If the truck had no internal scale 742, it is possible that the device could obtain this information directly from the scale 722 on the cart 720, or the weight data could be simple left blank and extracted from the cart ticket created by the cart 720 when the tickets are received and analyzed by the server 230.

When the truck 740 then delivers its load to the farmer's storage facility or to a customer, a new ticket could be created (a field-to-customer or a field-to-storage ticket), also with out operator intervention. A beacon could be set up at either location, thereby allowing the process to repeat much as when the cart 720 approached the semi truck 740. Alternatively, there may be no beacon at the destination (which may be likely when delivering the load to a customer). To allow the automatic creation of a ticket in these locations, the device 750 on the truck would know that the load was now to be delivered to some location after it detected the loading of the semi 740 from the field cart 720.

Since the device 750 cannot rely upon beacon information to determine its delivery location, the device 750 instead relies on GPS location. This GPS location can be determined from a GPS or other locating technology that is internal to the device 750 (such technology is commonly found in phones and tablet computers running the Android operating system or Apple's iOS) or by reading a GPS device on the truck 740 itself. This generated ticket could include the following information:
  Activity date (from smart device)
  Activity time (from smart device)
  Activity type (internal storage location or customer delivery, as determined from the GPS on a smart device or from a beacon at the delivery location)
  Supplying equipment (from the Grain Cart Beacon)
  Supplying operator (from the Grain Cart Beacon and system)
  Activity locations (field and dump location) from GPS in smart device
  Weight data (from the GC ticket matched by the system or read by the device at the scale house via Bluetooth)

This type of scenario applies to all of the activity ticket-based data creation and collection in harvest processes as well as in input management processes. The ability to sense and record related equipment and equipment proximity in a new and unique way enables smart devices in field equipment to auto generate activity tickets without user intervention. Importantly, this type of scenario applies broadly to a host of harvest or input management activities across a multitude of similar industries including: forestry (harvesting and planting of lumber and trees), mining (harvesting minerals), energy (harvesting oil and natural gas), or any agricultural sector.

Inputs

Figure 8:
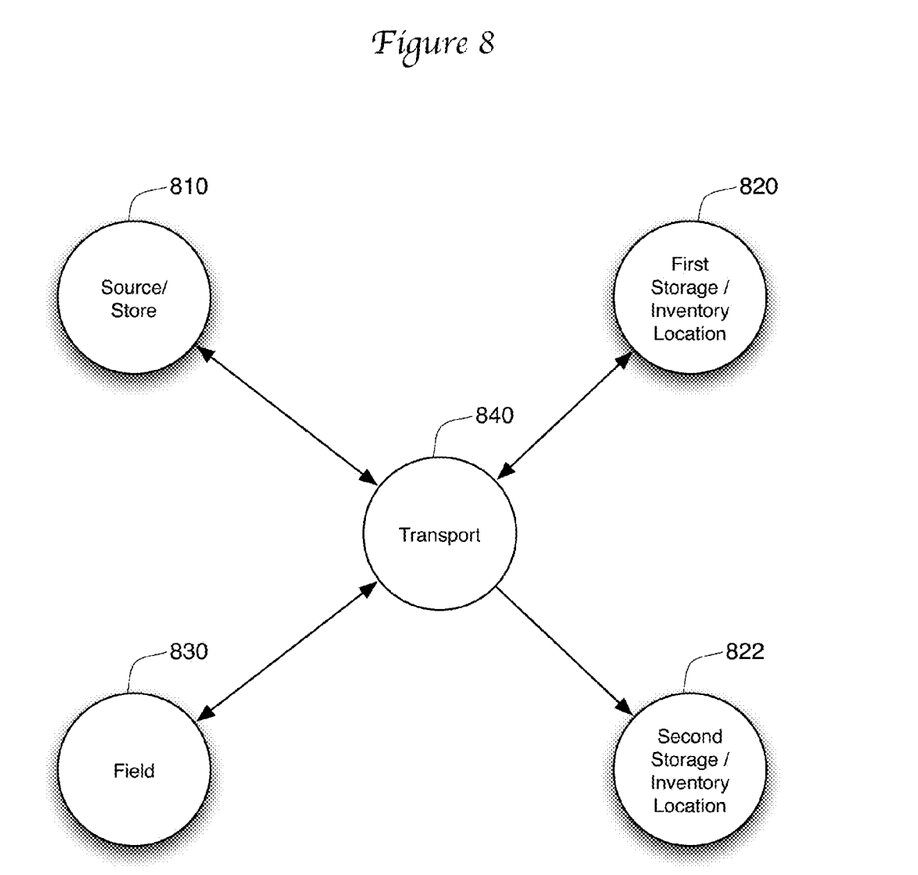
FIG. 8 is a schematic diagram showing relevant locations for the tracking of crop inputs.

The system described above is used to track crops or similar goods that are harvested from a location. As described in the above-identified priority provisional application, one embodiment of the current invention can also be used to track inputs at farmer fields. These "inputs" may constitute seeds for planting the crop in the field. Other inputs include fertilizers, pesticides, or herbicides that are sprayed or spread on a field to improve crop yields. As shown in FIG. 8, data tickets are created when input materials are moved between different locations 810, 820, 822, and 830. More particular, input related data tickets are created when inputs are received in inventory 820 or 822 after purchase from a source or store 810, are taken from inventory 820, 822 to be used in the field 830, are returned unused from the field 830 and placed back into inventory 820, 822, are moved from one inventory location 820 to another 822, and are returned from inventory 820, 822 to the store 810. Transport and other farm vehicles and equipment 840 provide the ability to move the inputs between these locations 810, 820, 822, and 830. In some embodiments, the transporting equipment 840 has weights, scales, and other measuring devices to help determine the quantity of inputs that are moved or applied by the vehicles 840.

As was the case in managing and tracking harvests, the tickets that are created to manage and track inputs have a different name and contain different data depending upon the movement being tracked. A "contract delivery ticket" is used to record the input (i.e., the product) and quantity that is received from the store 810 and put into inventory 820, 822 after purchase. This ticket would record the date of delivery and the inventory location 820, 822 that received the input. A contract delivery ticket can be created using a remote handheld (such as device 210 shown in FIG. 2) by the worker that received the input into inventory, or by back office personnel using the back office computer (such as computer 250 of FIG. 2).

A "load out ticket" is created when an input is taken out of inventory 820, 822. This ticket creates the input product, the quantity of product, the originating inventory location 820, 822 of the input, the equipment that received in the input, and the equipment operator. The "field application ticket" is used to recording planting, spraying, or spreading an input on a field 830. The field 830 on which an input is used, and the time at which the input was applied, is recorded in the field application ticket. In some embodiments, the field application ticket is submitted to the remote server 230 when the field application is completed, which allows the worker that completes the ticket to indicate whether the application to that entire field 830 has been completed. This allows the system 200 to track the completion of input application tasks on a field-by-field basis. A "field return ticket" is used to indicate that some of the inputs that were taken out of inventory 820, 822 through a load out ticket were not used on the field 830 (as indicated in the field application ticket) and are therefore returned into inventory 820, 822.

If inputs can be stored in multiple storage or inventory locations 820, 822, transfer tickets track the movement of inputs between these locations. A "transfer out ticket" indicates that the input has been removed from one location 820, and a "transfer in ticket" indicates that the input as been received at a second location 822. "Supplier return tickets" are used to indicate that input in inventory 820. 822 has been returned to the originating supplier 810 for a refund.

These input related tickets can be generated in the same manner as the harvest tickets. In other words, the tickets can be created manually in the field by workers using remote handheld devices 210-214, or can be created automatically using beacons and scales that are detectable and accessible to the devices 210-214 as described above. The tickets can be designed to refer to only one type of input at a time. If multiple types of inputs are removed from inventory 820, 822 for application on field 830, multiple input tickets would be used to track this movement. Alternatively, and preferably, tickets can be designed to allow the tracking of different inputs on a single ticket.

By tracking both inputs and harvests, a farmer can compare yield results to input applications on a field-by-field basis. In addition, the farmer can manage and track inventory of inputs and harvests, which helps the farmer prevent loss, identify spoilage and shrinkage points, and develop a greater understanding of their business.

The many features and advantages of the invention are apparent from the above description. Numerous modifications and variations will readily occur to those skilled in the art. For example, the above description explained that various software can be running on mobile devices that operating in various crop-related machines or at various crop-related locations. Many aspects of the present invention would be equally novel if these mobile devices were fixedly mounted in these locations so that they were no longer technically mobile. Furthermore, many aspects of the present invention remain novel even if the technology running these applications were embedded directly into the machinery or locations involved. Since such modifications are possible, the invention is not to be limited to the exact construction and operation illustrated and described. Rather, the present invention should be limited only by the following claims.

What is claimed is:

1. A method for tracking movement of a crop between machine locations, wherein each machine includes a broadcast beacon transmitting its identity to a receiver when the receiver is in proximity with the beacon comprising:
   a) detecting, using the receiver at a first machine, a unique first electromagnetic signal emanating from the beacon of a second machine;
   b) analyzing, using a processor, the unique first electromagnetic signal to identify the second machine only when the second machine and the first machine are within proximity of each other;
   c) detecting, using the processor, a change in a reading for a scale on one of the first and second machines;
   d) creating, using the processor, a first data ticket, the first data ticket including:
      i) data identifying the first machine,
      ii) data identifying the second machine, and
      iii) data identifying the change in the reading for the scale; and
   e) transmitting the first data ticket to a remote server for storage and analysis.

2. The method of claim 1, wherein the detection of the unique first electromagnetic signal emanating from the second machine triggers a communication link being established between the first machine and the second machine through which the data identifying the second machine is passed to the first machine.

3. The method of claim 1, wherein the processor resides on a first portable mobile device.

4. The method of claim 3, wherein the unique first electromagnetic signal emanating from the beacon of the second machine is incorporated into a second mobile device on the second machine.

5. The method of claim 4, wherein the unique first electromagnetic signal is a Wi-Fi signal generated by the second mobile device.

6. The method of claim 5, further comprising establishing a communication link between the first mobile device and the second mobile device and communicating, over the communication link, data about a current use state of the mobile devices.

7. The method of claim 1, wherein the step of detecting the change in the reading for the scale further comprises:
   i) submitting a plurality of queries from the processor to the scale, and
   ii) receiving, in response to each query, a current weight for the crop.

8. The method of claim 7, wherein the scale weighs the crop on the first machine.

9. The method of claim 1, wherein beacon periodically transmits the unique first electromagnetic signal to identify the second machine.

10. The method of claim 1, wherein the crop is an agricultural crop.

11. The method of claim 1, wherein the crop is selected from a set comprising lumber, minerals, oil, and natural gas.

12. The method of claim 1, further comprising:
   f) monitoring, using a GPS device, a location of the first machine;
   g) identifying when the location of the first machine is proximal to a physical location of a static storage site;
   h) after the identifying step, detecting, using the processor, a second change for the scale on the first machine;
   i) creating, using the processor, a second data ticket, the second data ticket including:

i) data identifying the first machine,
    ii) data identifying the static storage site, and
    iii) data identifying the second change of weight on the first machine; and
j) transmitting the second data ticket to the remote server for storage and analysis.

13. The method of claim 1, further comprising:
f) detecting, using the receiver at the first machine, a unique second electromagnetic signal emanating from a static storage site;
g) analyzing, using the processor, the unique second electromagnetic signal to identify the static storage site;
h) detecting, using the processor, a second change for the scale;
i) creating, using the processor, a second data ticket, the second data ticket including
    i) data identifying the first machine,
    ii) data identifying the static storage site, and
    iii) data identifying the second change for the scale; and
j) transmitting the second data ticket to the remote server for storage and analysis.

\* \* \* \* \*